United States Patent
Rivard et al.

(10) Patent No.: US 7,210,132 B2
(45) Date of Patent: Apr. 24, 2007

(54) INTEROPERABILITY OF OBJECTS BETWEEN VARIOUS PLATFORMS

(75) Inventors: John J. Rivard, Duvall, WA (US); Sam Spencer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 10/158,325

(22) Filed: May 30, 2002

(65) Prior Publication Data

US 2003/0225935 A1 Dec. 4, 2003

(51) Int. Cl.
*G06F 9/45* (2006.01)
*G06F 9/44* (2006.01)

(52) U.S. Cl. ............... 717/138; 717/136; 717/140; 717/147; 717/108; 719/328

(58) Field of Classification Search ............. 717/138, 717/136, 140, 147, 108; 719/328
See application file for complete search history.

(56) References Cited

U.S. PATENT DOCUMENTS

| | | | | |
|---|---|---|---|---|
| 5,590,331 A | * | 12/1996 | Lewis et al. ............... | 717/146 |
| 5,732,270 A | * | 3/1998 | Foody et al. ............... | 719/316 |
| 5,920,718 A | * | 7/1999 | Uczekaj et al. ............ | 717/108 |
| 6,026,238 A | * | 2/2000 | Bond et al. ................ | 717/138 |
| 6,052,527 A | * | 4/2000 | Delcourt et al. ........... | 717/138 |
| 6,134,559 A | * | 10/2000 | Brumme et al. ........... | 719/318 |
| 6,182,155 B1 | * | 1/2001 | Cheng et al. .............. | 719/315 |
| 6,263,492 B1 | * | 7/2001 | Fraley et al. .............. | 717/108 |
| 6,438,744 B2 | * | 8/2002 | Toutonghi et al. ......... | 717/137 |
| 6,678,885 B2 | * | 1/2004 | Reyna et al. .............. | 717/147 |
| 6,854,123 B1 | * | 2/2005 | Lewallen .................. | 717/136 |
| 2003/0009747 A1 | * | 1/2003 | Duran ....................... | 717/146 |

FOREIGN PATENT DOCUMENTS

WO   WO 01/98936 A2   12/2001

OTHER PUBLICATIONS

Rifon, et al., "A Component Model for Standardized Web-based Education", 2001, ACM, p. 86-95.*
Magnin, et al., "Our Guest Agents are Welcome to your Agent Platforms", 2002, ACM, p. 107-114.*

(Continued)

*Primary Examiner*—Wei Zhen
*Assistant Examiner*—Qamrun Nahar
(74) *Attorney, Agent, or Firm*—Woodcock Washburn LLP (57) ABSTRACT

Interoperability of a first framework or platform (e.g., COM) and a second different framework or platform (e.g., .NET) is provided via an attribute mechanism. The attribute mechanism is provided in a non-COM based platform (e.g., .NET) to expose classes to COM. In this manner, a compiler (e.g., the .NET compiler) creates class and events interfaces and adds attributes to the class and interfaces as appropriate for correct interoperability and marshaling. By adding this attribute mechanism to a class in .NET, the .NET compiler is able to use the class declarations (such as public methods, properties, and events) to automatically generate a class interface and an events interface, including appropriate dispatch IDs and GUIDs. Validation is performed on the class being mapped to provide an indication, such as an error message or warning, to the user that the underlying framework marshaling layer cannot marshal certain data types as desired or expected.

21 Claims, 7 Drawing Sheets

OTHER PUBLICATIONS

Arpinar, et al., "Provision of Market Services for eCo Compliant Electronic Marketplaces", 2000, ACM, p. 1-7.*

McDirmid, S. et al., "Jiazzi: New-age components for old fashioned java", *OOPSLA Conference*, 2001, Tampa Bay, Florida, USA, pp. 211-222.

Botton, D., "Interfacing Ada 95 to Microsoft COM and DCOM Technologies", *ACM SIGda Annual International Conference*, 1999, Redondo Beach, California, USA, pp. 9-14.

Vinoski, S., "New Features for CORBA 3.0", *Communications of the ACM*, 1998, 41(10), pp. 44-52.

Gray, D.N. et al., "Modern languages and Microsoft's component object model", *Communications of the ACM*, 1998, 41(5), pp. 55-65.

Shands, D. et al., "Secure virtual enclaves: Supporting coalition use of distributed application technologies", *ACM Transactions on Information and System Security*, 2001, 4(2), pp. 103-133.

Fradet, P. et al., "Consistency checking for multiple view software architectures", 7th *ACM SIGSOFT Symposium on Foundations of Software Engineering*, 1999, Toulouse, France, 19 pages.

Inverardi, P. et al., "Automatic synthesis of deadlock free connectors for COM/DCOM Applications", 9th ACM SIGSOFT Symposium on Foundations of Software Engineering, 2001, Vienna, Austria, pp. 121-131.

Gaifmn, H. et al., "Fully abstract compositional semantics for logic programs", *Proceedings of the Sixteenth Annual ACM Symposium on Principles of Programming Languages*, 1989, Austin, Texas, USA, pp. 134-142.

Atkinson, M.P. et al., "Types and Persistence in Database Programming Languages", *ACM Computing Surveys*, 1987, 19(2), pp. 105-170.

Leijen, D. et al., "Domain Specific Embedded Compilers", *DSL, Proceedings of the 2nd Conference on Domain-Specific Languages*, 2000, Austin, Texas, USA, pp. 109-122.

Mateev, N. et al., "Next-generation Generic Programming and its Application to Sparse Matrix Computations", *ICS, Proceedings of the 2000 International Conference of Supercomputing*, 2000, Santa Fe, New Mexico, USA, pp. 88-99.

Finne, S. et al., "H/Direct: A Binary Foreign Language Interface for Haskell", *ACM*, 1988, pp. 153-162.

Shepard, G. et al., "ATL and Connection Points", *Dr. Dobb's Journal*, 1998, 23(6), 117-119.

\* cited by examiner

```
<ComClass("12340013-0000-0010-8000-00AA006D2EA4")> _
Public Class Customer

<DispId(10000)> Public Property Name() As String
        Get
            return m_Name
        End Get
        Set (ByVal value As String)
            m_Name = value
        End Set <DispId(10001)> Public Sub AddOrder(ByVal o As
CustomerOrder)
        End Sub
    End Property <DispId(10002)> Public Event OrderAdded()
        End Sub End Class
```

Fig. 4

```
<ComClass("12340013-0000-0010-8000-00AA006D2EA4")> _
Public Class Customer
    Private m_SysString As String Public Property SysString() As _
        <MarshalAs(UnmanagedType.LPWStr)> String
        Get
            return m_SysString
        End Get
        Set (<MarshalAs(UnmanagedType.LPWStr)> ByVal
Value As String)
            m_SysString = Value
        End Set
    End Property Public Sub SetUnsignedShort( _
        <MarshalAs(UnmanagedType.U2)> n as Short)
        RaiseEvent GotUShort(n)
    End Sub Public Delegate Sub GotUShortDelegate( _
        <MarshalAs(UnmanagedType.U2)> n as Short)

Public Event GotUShort As GotUShortDelegate

End Class
```

Fig. 5

```
<ComClass("12340013-0000-0010-8000-00AA006D2EA4")> _
Public Class Customer

Public ReadOnly Property CustomerId() As String
        Get
            return m_CustomerId
        End Get
    End Property Public Function GetAccountBalance( _
        ByVal AccountType As String) As Integer
        return 0
    End Function Public Event AccountUpdated()

End Class
```

Fig. 6

```
<ComClass("12340013-0000-0010-8000-00AA006D2EA4"), _
Guid("12340013-0000-0010-8000-00AA006D2EA4"), _
ClassInterface(ClassInterfaceType.None), _
ComSourceInterfaces("Customer+_Customer")> _
Public Class Customer
      Implements Customer._Customer <Guid("56780013-0000-0010-8000-00AA006D2EA4")>
      Interface _Customer
            <DispId(1)> ReadOnly Property CustomerID()
As String
            <DispId(2)> Function GetAccountBalance( _
                  ByVal AccountType As String) As Integer
      End Interface <Guid("9ABC0013-0000-0010-8000-00AA006D2EA4")> _
      InterfaceType(ComInterfaceType.InterfaceIsIDispat
ch)> _
      Interface __Customer
            <DispId(1)> Sub AccountUpdated()
      End Interface Public ReadOnly Property CustomerId() As String _
            Implements _Customer.CustomerId
            Get
                  return m_CustomerId
            End Get
      End Property Public Function GetAccountBalance( _
            ByVal AccountType As String) As Integer _
      Implements _Customer.GetAccountBalance
            return 0
      End Function Public Event AccountUpdated()

End Class
```

Fig. 7

INTEROPERABILITY OF OBJECTS BETWEEN VARIOUS PLATFORMS

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2002, Microsoft Corporation, All Rights Reserved.

FIELD OF THE INVENTION

This invention relates in general to the field of software. More particularly, this invention relates to interoperability of objects between various platforms.

BACKGROUND OF THE INVENTION

To manage the complexity of long computer programs, computer programmers often adopt object-oriented programming techniques. With these techniques, a computer program is organized as multiple smaller modules called objects. An object is a unit of code comprising both routines and data and is thought of as a discrete entity. These objects perform specified functions and interact with other objects in pre-defined ways. Objects communicate with each other through interfaces. Each object may have multiple interfaces. An interface exposes and defines access to the object's public routines and data. Put another way, an interface can be considered as the definition of an expected behavior and expected responsibilities. One of the advantages to interfaces is that a client object can continue to access the methods of a server object that are exposed through the interface, regardless of whether the underlying code in the object is updated or changed for another reason.

One of the primary benefits of object-oriented programming is that the objects can be easily and affordably adapted to meet new needs by combining them in a modular fashion. The structural foundation for an object-oriented language is the object model. The Component Object Model (COM) produced by Microsoft Corporation of Redmond, Wash., is an example of an object model.

COM is a software architecture for creating and using objects, which makes software easier to write and reuse. In COM, an object is some piece of compiled code that provides some service to the rest of the system. Services are used in a standard way, regardless of location. COM allows an object to expose its functionality to other objects and to host applications. In this manner, COM allows objects made by different software vendors to be combined into a variety of applications.

COM defines a binary standard for component interoperability (e.g., for function calling between components) and is not dependent on any particular programming language. In this manner, binary executables are able to interoperate. Thus, COM can be used with any programming language that uses a binary standard, such as Visual Basic, JAVA, and C++.

In COM, applications interact with each other and with the system through collections of functions called interfaces. A COM interface is a strongly-typed contract between software components to provide a small but useful set of semantically related operations or methods. Thus, in COM, an interface is a related group of functions and is the binary standard through which objects communicate. As noted above, an object can, and typically does, implement more than one interface. Every interface has its own identifier, a globally unique ID (GUID). A GUID is an integer (typically a 128-bit integer) that is guaranteed to be unique in the world across space and time. GUIDs are used to identify every interface and every component object class. Human-readable names are assigned only for convenience and are locally scoped. This helps to ensure that COM components do not accidentally connect to the wrong component, interface, or method, even in networks with millions of component objects. Thus, developers create their own GUIDs when they develop component objects and custom interfaces. Through the use of "defines", developers do not need to be exposed to the actual (128-bit) GUID. Thus, if a developer creates a new interface, he must also create a new identifier for that interface. When a developer uses an interface, he must use the identifier for the interface to request a pointer to the interface. This eliminates naming conflicts that would result in runtime failure.

It is noted that COM interfaces are not versioned, which avoids version conflicts between new and old components. A new version of an interface is an entirely new interface and is assigned a new unique identifier.

While COM objects have been fundamental to programming for many years, applications designed for use with other platforms, such as the .NET platform produced by Microsoft Corporation of Redmond, Wash. and described in PCT Publication WO 01/98936 having an international filing date of Jun. 22, 2001 and incorporated herein by reference, offer many advantages.

Code developed for the .NET platform is referred to as managed code, and contains metadata (data about data) that is used by the common language runtime. Data used by .NET applications is called managed data because the .NET runtime manages data-related tasks such as allocating and reclaiming memory, and type checking.

As noted above, COM provides a binary standard between two objects. However, .NET is a logical standard and not a binary standard, and accordingly is a different platform than COM.

An assembly is the primary building block of a .NET platform application. It is a collection of functionality that is built, versioned, and deployed as a single implementation unit containing one or more files. Interoperability marshaling is the process of packaging parameters and return values into equivalent data types as they move to and from COM objects.

.NET applications share a set of common types that allow interoperability of objects, regardless of the programming language used. The parameters and return values of COM objects sometimes use data types that are different than those used in managed code.

Conventionally, for a user to map one standard to another standard (e.g., map COM object members to equivalent .NET managed members), the user would have to manually map the new standard to the old standard. The manual method for exposing a class from the .NET platform to COM is very complex and requires extensive knowledge about COM programming. To expose a .NET object to COM, the .NET assembly needs to include the descriptions of the objects in the form of interfaces that COM understands. That consists of a number of interfaces and attributes. The developer would have to manually create the class interface and the events interface and would need specific knowledge of .NET interop to add the necessary interop attributes to the class and interfaces. Additionally, maintaining the COM interfaces and attributes during the development cycle is difficult and the chances of making a mistake are high.

Another conventional approach is to use the default "auto-dual" class interface support provided by the .NET runtime, but this has some deficiencies: (1) it does not provide "events", which is generally unacceptable to a user, and (2) it breaks down over time because any public change to a base class changes the default class interface. Yet another prior art approach is to generate the interface code and inject it into a user's source file. This is not desirable because it intrudes on a user's code.

In view of the foregoing, there is a need for systems and methods that overcome the limitations and drawbacks of the prior art.

SUMMARY OF THE INVENTION

The present invention overcomes these problems by providing interoperability of a first framework or platform (e.g., COM) and a second different framework or platform (e.g., .NET).

According to an embodiment of the invention, an attribute mechanism is provided in a non-COM based platform (e.g., .NET) to expose classes to COM. In this manner, the compiler (e.g., the .NET compiler) creates class and events interfaces and adds attributes to the class and interfaces as appropriate for correct interoperability and marshaling. By adding this attribute mechanism to a class in .NET, the .NET compiler is able to use the class declarations (such as public methods, properties, and events) to automatically generate a class interface and an events interface, including appropriate dispatch IDs (described below) and GUIDs.

According to aspects of the invention, validation is performed on the class being mapped to provide an indication, such as an error message or warning, to the user that the underlying framework marshaling layer cannot marshal certain data types as desired or expected.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention is directed to systems and methods that provide interoperability of a first framework or platform (e.g., COM) and a second different framework or platform (e.g., .NET). The present invention can be implemented in a variety of languages and tools such as Visual Basic, Visual C++, Visual C#, Visual FoxPro, all produced by Microsoft Corporation of Redmond, Wash. It is contemplated that the invention can be implemented on any compiler that specifically targets the .NET runtime, including non-Microsoft implementations. Moreover, the invention can be used with other object models (e.g., objects designed according to the Common Object Request Broker Architecture (CORBA) or according to Sun Microsystems' Java specifications).

Many conventional programming languages and tools, such as Microsoft Visual Basic 6.0, are heavily COM based and automatically expose most classes to COM. Thus, a user has come to expect that he can expose classes to COM without much labor or technical expertise. The present invention provides an attribute mechanism in a non-COM based platform (such as .NET, and more particularly Visual Basic.NET) to expose classes to COM. Thus, for example, in accordance with an embodiment of the present invention, a Visual Basic developer can add an attribute (e.g., ComClassAttribute, as described in further detail below) to Visual Basic.NET that allows interoperability with COM, as the developer would have experienced with Visual Basic 6. In this manner, the compiler (e.g., the Visual Basic.NET compiler) can create class and events interfaces and add attributes to the class and interfaces as appropriate for correct interoperability and marshaling. Therefore, the invention allows the developer to ignore many of the underlying details of interoperating with COM while allowing the developer the ability to specify explicit marshaling attributes and virtual function table (v-table) ordering, if desired. For any given platform (hardware and operating system combination), COM defines a standard way to lay out v-tables in memory, and a standard way to call functions through the v-tables. Thus, any language that can call functions via pointers can be used to write components that can interoperate with other components written to the same binary standard. The double indirection (the client hold a pointer to a pointer to a pointer to a v-table) allows for v-table sharing among multiple instances of the same object class. On a system with hundreds of object instances, v-table sharing can reduce memory requirements considerably.

By adding this attribute mechanism to a class in .NET, the .NET compiler is able to use the class declarations (such as public methods, properties and events) to automatically generate a class interface and an events interface, including appropriate dispatch IDs and GUIDs. A dispatch ID is a type of token that is passed to the dispatch interface to invoke a corresponding member function. Aspects of the present invention are also directed to performing validation on the types of function parameters, and providing an indication, such as an error message or warning, to the user that the underlying .NET framework marshaling layer cannot marshal certain data types as expected.

Exemplary Computing Environment

Figure 1:
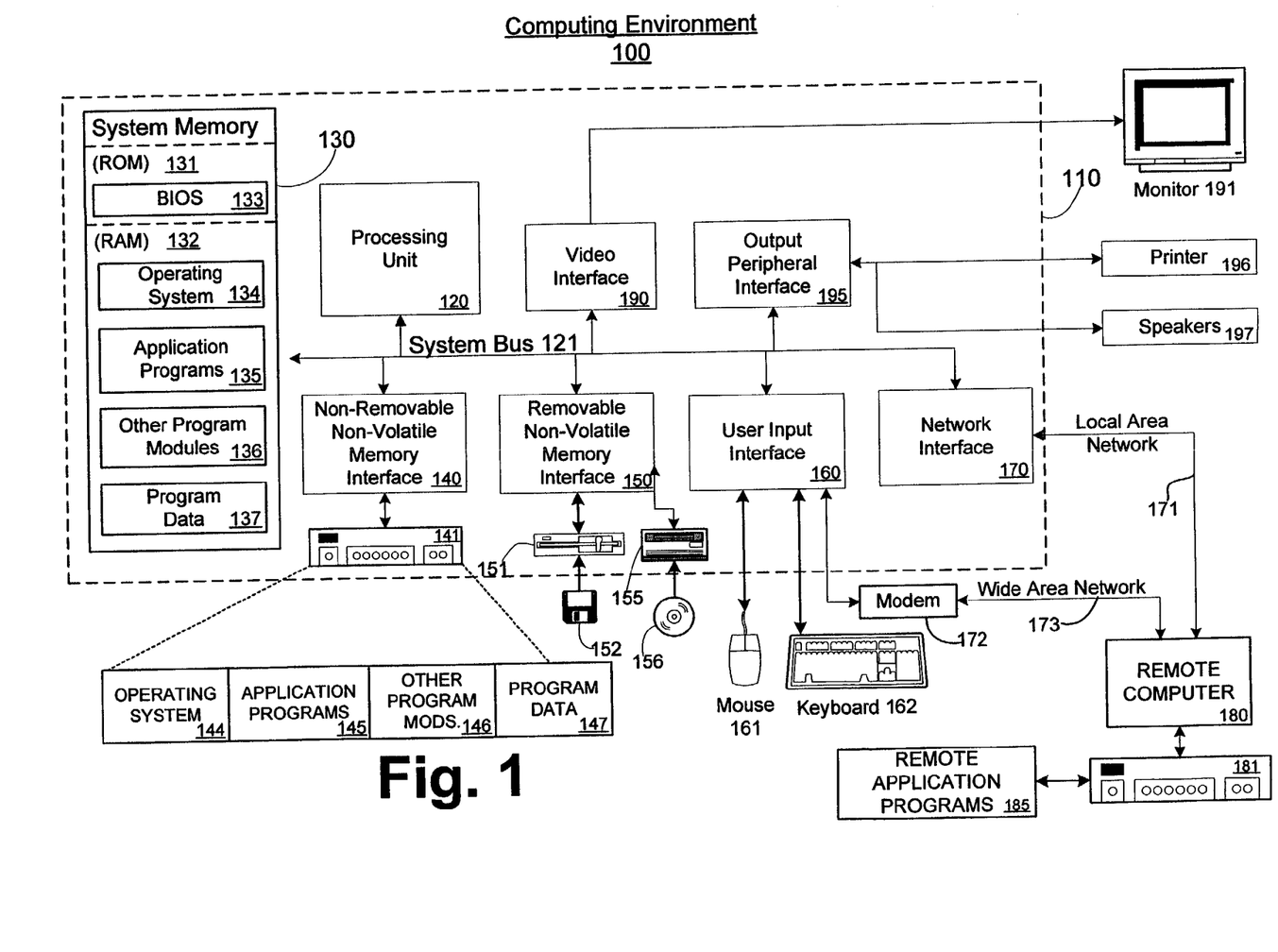
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that interoperability services may be performed by, supported in, or accessed via all of .NET's languages and services, and in other distributed computing frameworks as well.

Exemplary Embodiments

There is a transition from a platform that recognizes COM objects (e.g., Microsoft Visual Basic 6.0) to a platform that has limited support for interoperability with COM objects (e.g., Visual Basic.NET). In Microsoft Visual Basic 6.0, the user was abstracted from COM and did not have to be concerned about the underlying COM. It is desirable that when transitioning to Visual Basic.NET, the user also does not have to concern himself with the underlying COM.

The present invention acts as a map from a first framework or platform (e.g., COM with Microsoft Visual Basic 6.0) to a second framework or platform (e.g., .NET with Visual Basic.NET). COM provides a binary standard or format between two objects, whereas .NET provides a different standard or format (e.g., a logical standard). The present invention compensates for the changed platform and provides a map or interface between the binary standard and the new standard. In this manner, a user does not have to learn any sort of "middle man" object or application programming interface (API) to transition his work from Microsoft Visual Basic 6.0 to Visual Basic.NET. Preferably, the invention is part of the compiler implementation targeting the .NET Platform (i.e., an extension to the language being used in accordance with .NET, such as Visual Basic-.NET). Although the exemplary embodiments described herein are directed to Visual Basic, COM, and .NET, it is noted that the present invention is not limited to these programming languages and platforms, and that the present invention can be implemented with a variety of languages, tools, platforms, and environments, produced by Microsoft Corporation of Redmond, Wash., as well as other parties. Moreover, the present invention can be implemented on any language that targets the .NET runtime.

Preferably, the compiler generates the interfacing and compensating at compilation time using at least one attribute. .NET uses attributes regularly to add extra information to a class. The attribute used by the present invention will be referred to herein as "ComClassAttribute". The ComClassAttribute simplifies the entire process by having the user specify only one attribute and, optionally, the GUIDs for the class ID, the interface ID, and the events interface ID. An exemplary type declaration for an exemplary ComClassAttribute in accordance with the present invention is described below.

Sometimes, not all of the objects can be mapped from the first platform to the second platform. Accordingly, it is desirable to pre-screen the objects and alert the user to those objects that cannot be mapped. Therefore, an interface definition is generated, and compiler errors and/or warnings are provided where the interfacing is unavailable or otherwise will not work at runtime. In this manner, the user knows the boundaries he can work in. Therefore, for example, a user who can create an object in a programming language (e.g., in Microsoft Visual Basic 6.0) on a first platform (e.g., COM) and can recreate it in a programming language (e.g., Visual Basic.NET) on a second platform (e.g., .NET) without any additional information, and without the requirement of technical expertise or understanding of the first platform (e.g., COM).

Initially, when it is determined that an interface or mapping is desired (e.g., by a user), the usage of the ComClassAttribute is validated, preferably in one pass for each class. During the validation phase, several conditions are tested to determine whether anything is present in the class that cannot be compensated for by the interface and attribute aspects of the present invention. If so, errors and/or warnings are generated and provided to the user. After validation, appropriate interfaces and attributes are generated to provide the desired interoperability between the two platforms.

Figure 2:
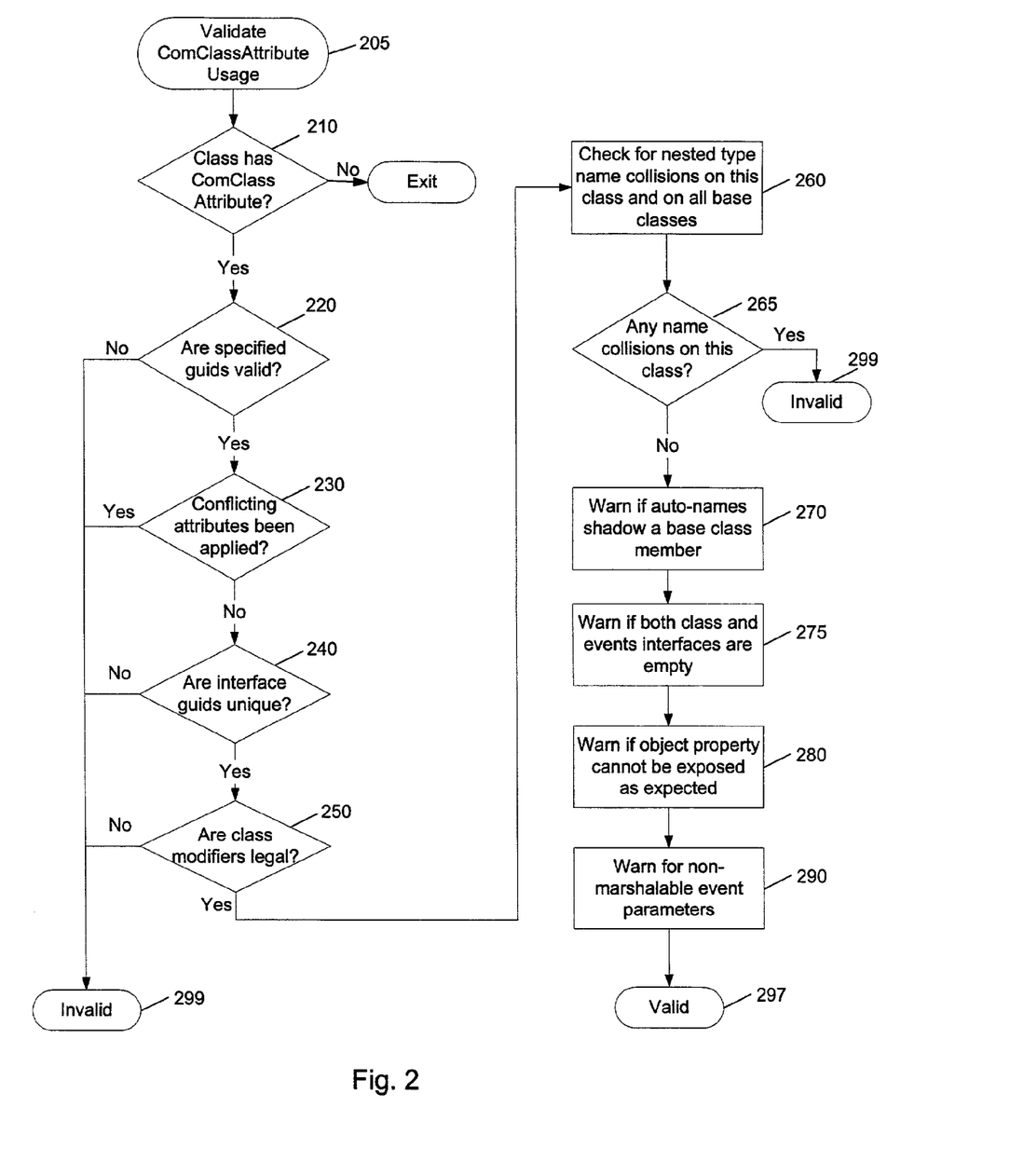
FIG. 2 is a flow chart of an exemplary method of validating attribute usage in accordance with the present invention.

FIG. 2 is a flow chart of an exemplary method of validating attribute usage in accordance with the present invention. When an interface or mapping is desired between the two platforms, validation is initiated at step 205 by checking a number of rules such as those now described. It is determined at step 210 whether the appropriate attribute (e.g., ComClassAttribute) has been added to the class being mapped. If not, then the interface cannot be generated and the routine exits. If the ComClassAttribute has been added to the class, then a set of rules is checked.

At step 220, it is determined whether each of the user-specified GUIDs in the class is valid. If not, then it is determined that an interface cannot be generated for the class and an invalidity warning or other error indication is generated, at step 299. It should be noted that the user can specify additional IDs such as a co-class ID, a class ID, and an events ID. An invalid GUID might be due to a bad format, for example. In such a case, an exemplary error message might be "Bad attribute 'GuidAttribute': The format of the ID 'param-value' is not correct." This error is preferably generated if the user specifies a GUID parameter to ComClassAttribute that is not a valid ID of a particular format, such as "xxxxxxxx-xxxx-xxxx-xxxx-xxxxxxxxxxxx".

If the GUIDs are valid, then it is determined whether attributes conflict in the class, at step 230. If there is a conflict, then it is determined that an interface cannot be generated for the class and an invalidity warning or other error indication is generated, at step 299. An error would be indicated, for example, if there were a reserved attribute conflict. In such a case, an exemplary error message is "Cannot apply both 'ComClassAttribute' and 'attribute' to the same class." The ComClassAttribute implies that the compiler will auto-generate certain attributes that may not be applied by the user. These include GuidAttribute, ClassInterfaceAttribute and ComSourceInterfacesAttribute. Certain other attributes, such as ComVisible(False), are not compatible with proper COM interop and are disallowed.

If there are no conflicting attributes, it is determined at step 240 whether the interface GUIDs are unique. For example, the class ID and the events ID cannot be the same GUID. If the GUIDs are not unique, then it is determined that an interface cannot be generated for the class, and an invalidity warning or other error indication is generated, at step 299. An exemplary error message is "The 'InterfaceId' and 'EventsId' parameters for 'ComClassAttribute' on 'class' cannot have the same value." The user desirably must specify unique GUIDs for the class and events interfaces.

If the interface GUIDs are unique, it is determined whether the class modifiers are legal, at step 250. The class desirably obeys publicness so that at runtime it can be exposed to the first platform (e.g., COM). An exemplary error might be that ComClassAttribute requires a public class. In such a case, an exemplary error message may be "Cannot apply 'ComClassAttribute' to 'class' because 'container' is not public." If the class is not public, or if a containing class or module is not public, the class cannot be exposed to COM. Also, typically the class cannot be a module and cannot be an abstract. Thus, if the class modifiers are not legal, then it is determined that an interface cannot be generated and an invalidity warning or other error indication is generated, at step 299.

If the class modifiers are legal, then at steps 260 and 265, there is a check for nested type name collisions on the present class and preferably on all base classes. These checks are performed in order to avoid conflicts with the generated interfaces and other names in the user's code. If there is a name collision on the present class, then it is determined that an interface cannot be generated and an invalidity warning or other error indication is generated, at step 299.

If there are no name collisions on the present class, then it is determined that the class is valid. However, it should be noted that there may be additional error checks in addition to those set forth above. For example, a check may be made of the reserved Dispatch ID. An error message such as "Cannot apply the 'DispIdAttribute' value to 'member' because 'ComClassAttribute' reserves zero for the Default Property" may be generated if the user has specified the value zero (0) for the DispIdAttribute. The value zero is reserved for a property that is marked "default". OLE Automation treats dispatch ID zero as the default property. (OLE refers to Object Linking and Embedding, which is MICROSOFT™'s mechanism for allowing documents and applications to access data and subroutines from within other applications).

Similarly, an error message such as "Cannot apply the 'DispIdAttribute' value to 'member' because 'ComClassAttribute' reserves values less than zero for COM" may be generated if the dispatch ID has a value less than zero. Dispatch IDs less than zero have special meaning. For example, the ID (−4) is typically reserved for OLE Automation enumerators.

Before beginning the interface and attribute generation (FIG. 3, and described in further detail below), several non-fatal conditions are checked and warnings are generated if any of those conditions are present.

In particular, a warning is typically generated at step 270 if the auto-generated interface name is shadowing a member of the same name on a base class. In such a case, an exemplary warning message is "'ComClassAttribute' is on class 'class' implicitly defines 'Interface Name' which conflicts with a member of the same name in 'Class baseclass'. Use 'ComClassAttribute(InterfaceShadows:=True)' if you want to hide the name on the base baseclass." This warning gives the user explicit knowledge that the auto-generated interface name is shadowing a member of the same name on a base class. The user can add InterfaceShadows:=True to the ComClassAttribute to eliminate the warning. This is consistent with adding the shadows keyword to a normal class member.

Similarly, a warning is typically generated at step 275 if both the class and events interfaces are empty (i.e., if nothing public is exposed). In such a case, an exemplary warning message is "'ComClassAttribute' is specified for class 'class' but there are no public members of 'class' that can be exposed to COM; no COM interfaces generated." If there are no public methods, properties, or events that can be exposed on the COM interfaces, the compiler will warn the user that no interfaces will be generated for the class.

At step 280, a warning is typically generated if an object property in the class cannot be exposed as the user would expect (e.g., if the user expectation in Visual Basic 6 does not correlate with the way it really works in Visual Basic-.NET), and at step 290, a warning is generated if non-marshalable event parameters are present (i.e., there is a structure problem with the events). It is noted that events are marshaled late-bound, and structure parameter types cannot be marshaled. It is noted that the presence of any one or more of these conditions is typically not fatal and desirably, only a warning message (i.e., not an error message) is generated if any one or more of these conditions is present.

Figure 3:
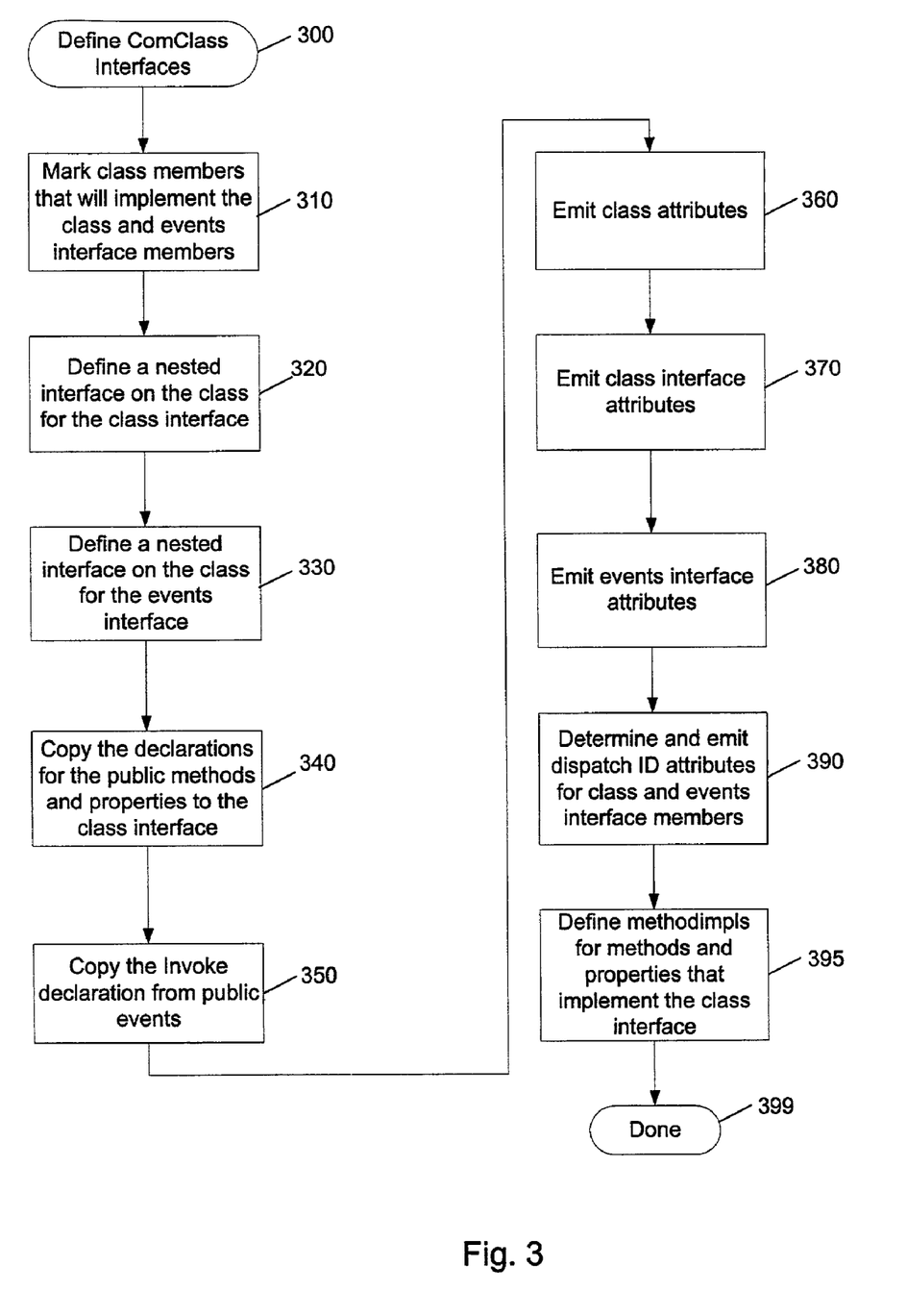
FIG. 3 is a flow chart of an exemplary method of generating interfaces and attributes in accordance with the present invention.

After any warnings have been generated (steps 270–290), it is concluded at step 297 that the class is valid, and interfaces and attributes are then generated, preferably at compilation time, in accordance with the flow chart shown in FIG. 3.

Step 300 begins the interface and attribute definition, referred to as the ComClass interface. At step 310, class members that will implement the class and events interface members are marked. This is a marking phase in which all members of the class that are eventually going to be exposed are marked. Step 310 is used in later error detection and for defining method impulse (see, for example, step 395).

Step 320 creates a nested interface on the class to define the class interface (e.g., "_ClassName"), and step 330 defines a nested interface on the class for the events interface (e.g., "_ClassName" (double-underscore prefix)). The interface token is preserved or otherwise cached for later use, if needed. At step 340, the declarations for the public methods and properties are copied to the class interface using an interface token from step 320. This preserves the metadata tokens for applying attributes and defining method impulse. The interfaces created in step 320 are now populated.

The Invoke method declaration of the event delegate class is copied from public events at step 350 in order to fill the interface created in step 330, using an interface token from step 330. Similar to step 340, this preserves the metadata tokens for applying attributes. It is noted that this would be very difficult for a user to perform manually. Thus, a definition has been generated from the second platform to the first platform (e.g., from .NET to COM).

At step 360, class attributes are emitted or applied (e.g., "GUID", "ClassInterface", "ComSourceInterfaces"), along with class interface attributes on each of the nested interfaces (step 370 using an interface token from step 320) (e.g., "GUID attribute", "ComVisible(true)" if it is set on the class), and events interface attributes on the events interface (step 380 using an interface token from step 330) (e.g., "GUID attribute", "InterfaceTypeAttribute(InterfaceIsIDispatch)", "ComVisible(true)" if it is set on the class). In other words, attributes are applied to each of the interfaces.

ID attributes are determined and emitted at step 390 for class and events interface members using member tokens from steps 340 and 350. Here, dispatch IDs are defined for class interfaces and the events interface. This takes into account special IDs such as "DISPID_NEWENUM" and "DISPID_VALUE" and also allows the user to supply custom ID values. The dispatch ID gets determined automatically, and is preferably declared in three places: (1) the property, (2) the "get" for the property, and (3) the "set" for the property. For properties, it is typical that the same dispatch ID is emitted on the property declaration and on the related get and set accessor methods.

At step 395, the "methodimpl" is defined for methods and properties that implement the class interface using member tokens from steps 340 and 350. This effectively links the class and events interfaces together. The procedure then ends at step 399. The compiler associated with the second platform (e.g., Visual Basic.NET) thus exposes public classes to the first platform (e.g., COM) via the ComClassAttribute. Put another way, the ComClassAttribute generates the desired metadata (interfaces and attributes) at compile time sufficient to expose the public methods, properties and events on the class to COM.

Further exemplary details regarding generating class attributes, generating the class interface, and generating the events interface are provided below.

The ComClassAttribute

An exemplary type declaration for an exemplary ComClassAttribute in accordance with the present invention is as follows:
  Public NotInheritable Class ComClassAttribute:
  Inherits Attribute Exemplary Constructors Include:
  ComClassAttribute()
  ComClassAttribute(ClassId As String)
  ComClassAttribute(ClassId As String, InterfaceId As String)
  ComClassAttribute(ClassId As String, InterfaceId As String, EventsId As String)

The ClassId, InterfaceId and EventsId parameters are preferably all GUIDs of the format "xxxxxxxx-xxxx-xxxx-xxxx-xxxxxxxxxxxx". If the parameter is omitted, is nothing or is blank (""), the compiler preferably generates a new unique GUID on each compilation.

Exemplary Properties Include:
  Public ReadOnly Property ClassId As String
  Public ReadOnly Property InterfaceId As String
  Public ReadOnly Property EventsId As String
  Public Property InterfaceShadows As Boolean Desirably, the ComClassAttribute can only be applied to a class that is public from the assembly. The class is desirably public, and if it is nested within a containing class or module, the container(s) are also desirably public.

Generating Class Attributes

Adding the ComClassAttribute implies that the compiler will add other attributes, as described below, to the class as needed for interop (in this exemplary case, the .NET COM interop). These exemplary attributes include:

GuidAttribute—The value of ComClassAttribute.ClassId is typically used for the class's GUID. If the developer has not explicitly set the ClassId parameter or it is nothing or blank, the compiler will generate a new unique GUID on each compilation.

ClassInterfaceAttribute—The ClassInterfaceAttribute is typically added to the class with the value of ClassInterfaceType.None. This tells COM interop to use the first implemented interface on the class as the default COM class interface.

ComSourceInterfacesAttribute—The ComSourceInterfacesAttribute is typically added to the class with the type name of the COM events interface that was generated for this class. If the class has no public events, the compiler will not generate an events interface and will not add the ComSourceInterfacesAttribute.

In terms of restrictions, because the compiler will add these attributes to the class, the developer may not also specify following attributes on the class along with the ComClassAttribute:

System.Runtime.InteropServices.GuidAttribute
    System.Runtime.InteropServices.ClassInterfaceAttribute
    System.Runtime.InteropServices.ComSourceInterfacesAttribute In addition, one may not make the class invisible to COM interop by adding System.Runtime.InteropServices.ComVisible(False). If there are members that would be emitted on the class interface or on the events interface, the compiler will typically emit a warning that no COM interfaces will be generated for the class.

Generating The Class Interface

The compiler preferably generates a class interface based on the members of the class. The class is marked as implementing this interface before any other implemented interfaces so that COM interop treats the class interface as the default interface of the co-class. The class interface name is preferably the same as the class name with a single underscore prefixed and is declared nested under the class.

The compiler typically will generate a class interface based on the public methods and properties of the class. The members of the class interface are preferably declared in the same order as they appear on the class and preserve the name, signature and attributes of the class members. The following class members are typically explicitly excluded from the class interface:

Non-public methods and properties
    Shared (static) methods and properties
    Base class members
    Constructors, Fields, Events, Declares
    Synthetic methods, such as event add/remove methods and or a synthetic Main, that is, other public methods automatically generated by the compiler but not specified in the code.
    Members marked with ComVisible(False)

Overloaded public members are included. A type library exporter (TLBEXP) typically will change the names of overloaded members by appending_2,_3 . . . , for example.

The compiler typically will generate dispatch IDs for each of the members of the interface beginning with 1 and incrementing for each member on the interface. The compiler will not re-use values that have been explicitly applied by the user.

If a property is designated as "default", the dispatch ID is 0, which indicates the default member. If a function has the name and signature "Function GetEnumerator( ) As System.Collections.Ienumerator", the dispatch ID typically is (−4) which indicates an enumerator to OLE Automation.

If the user designates a dispatch ID on a member of the class, the ID will be preserved on the interface member. If the user sets a dispatch ID on a property, the same ID will also be reflected on the get and set methods. The user may not specify the value zero or any values less than zero because these are reserved.

Regarding attributes, the compiler will add the GuidAttribute to the class interface based on the ComClassAttribute.InterfaceId. If the developer has not explicitly set the InterfaceId parameter or it is nothing or blank, the compiler will generate a new unique GUID on each compilation.

Typically, all user-specified attributes on members of the class are duplicated on the class interfaces, including parameters and return values.

Restrictions include no other member of the class can use same name as the class interface. The compiler reserves dispatch IDs less than or equal to zero. The user may not specify a dispatch ID in this range on a member that will be a part of the class interface.

Generating The Events Interface

The compiler will generate an event interface based on the public events of the class. If the class has no public events, no events interface is generated. The members of the events interface are not declared as "event" but as "sub" because they need to match the signature of the event delegate "invoke" member. This is required by the COM interop layer.

The events interface name is the same as the class name with a double underscore prefixed and is declared nested under the class.

Regarding included members, the compiler will generate an events interface based on the public events of the class. The members of the events interface are declared in the same order as they appear on the class and preserve the name and attributes of the event and the signature of the event delegate.

The following members are explicitly excluded:
    All members that are not declared as Event
    Non-public events
    Shared (static) events
    Base class events
    Members marked with ComVisible(False)

Overloaded public events are included. The type library exporter (TLBEXP) typically will amend the names of overloaded members on the events interface by appending_2,_3 . . . , for example.

The compiler will generate dispatch IDs for each of the members of the interface beginning with 1 and incrementing for each member on the interface. The compiler will not re-use values that have been explicitly applied by the user.

If the user designates a dispatch ID on a member of the class, the ID will be preserved on the interface member. If the user sets a dispatch ID on a property, the same ID will also be reflected on the get and set methods. The user may not specify the value zero or any values less than zero because these are reserved.

Regarding attributes, the compiler will add the GuidAttribute to the events interface based on the ComClassAttribute.EventsId. If the developer has not explicitly set the EventsId parameter or it is nothing or blank, the compiler will generate a new unique GUID on each compilation. The compiler will add the InterfaceTypeAttribute to the events interface specifying that it is an IDispatch only interface. (It is noted that Visual Basic 6 does not support event interfaces that are dual.) All user-specified attributes on events of the class will be on the events interface, including parameters. If a parameter is of type "String" and the user has not specified the MarshalAs attribute, the compiler will set the marshaling on the class interface to BSTR, which is OLE Automation compliant.

Regarding restrictions, no other member of the class can use same name as the events interface.

The compiler reserves dispatch IDs less than or equal to zero. The user may not specify a dispatch ID in this range on a member that will be a part of the class interface.

Exemplary Code and Usage

It is typical for an interface to expose enums, structures or other classes as parameters or return values. The type library exporter (TLBEXP) will generate definitions for all public types exposed from the assembly. Therefore, it is valid to use any public type on a member that will be exposed to COM.

If an interface exposes another class as a parameter or return type, the other class will, by default, be exposed as an empty IDispatch object. The user can add the ComClassAttribute to the other class to provide it with a full class interface on the COM interface.

Desirably, all of the COM GUIDs are specified by setting the ComClassAttribute parameters. If they are not specified explicitly, the compiler will generate new unique GUIDs on every compilation. It is therefore recommended one specifies all three GUIDs explicitly.

To specify a dispatch ID on a property, add the DispIdAttribute to the Property. It is not necessary to add the DispIdAttribute to the Get or the Set; the compiler will apply the property dispatch ID to the Get and Set accessor methods. To specify a dispatch ID on a Sub or Function, add the DispIdAttribute to the Sub or Function. To specify a dispatch ID on an Event, add the DispIdAttribute to the Event.

Figure 4:
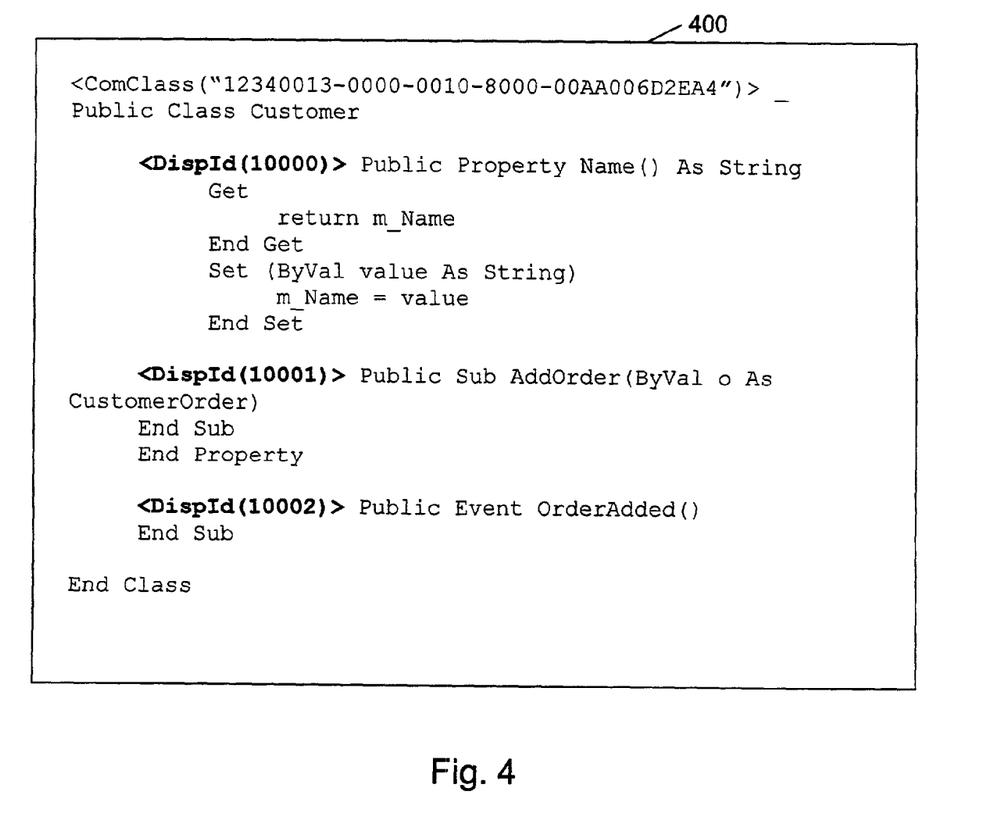
FIG. 4 is an exemplary programming code listing for a file having Visual Basic code with a dispatch ID in accordance with the present invention.

As noted above, if ComClassAttribute is used, the value zero or any values less than zero are reserved by the compiler and cannot be specified. (Note that if ComClassAttribute is not specified, there are no compile-time restrictions on the dispatch ID values.) An example of code 400 specifying a dispatch ID is shown in FIG. 4.

In some cases, it is desirable to specify particular data type marshaling for parameters and return values. By default, the compiler will mark all String parameters and return values for OLE Automation compliance. If a user specifies his own marshaling attributes, the compiler will preserve them on the auto-generated interfaces.

Figure 5:
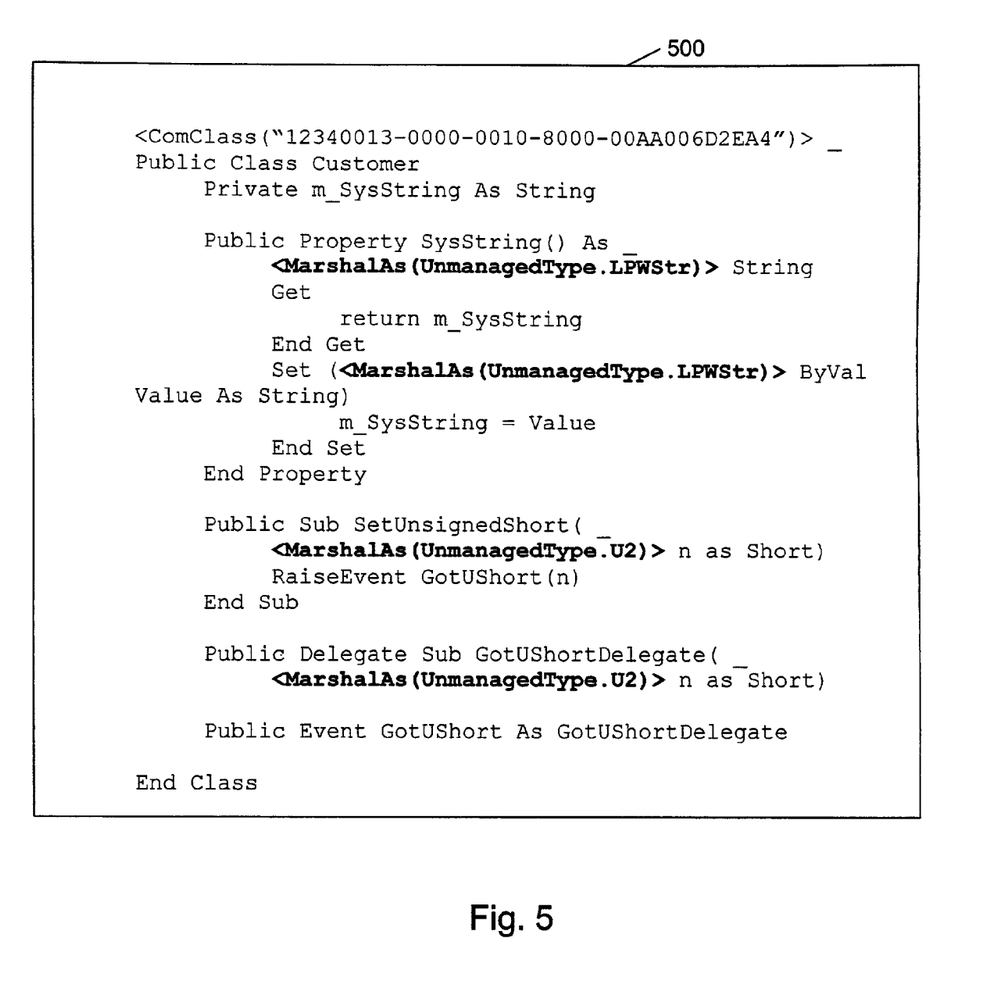
FIG. 5 is an exemplary programming code listing for a file having Visual Basic code with marshaling attributes in accordance with the present invention.

To specify marshaling attributes for a Sub or Function, add the MarshalAsAttribute to the particular parameter or return value. For a Property, specify the MarshalAsAttribute in the As clause of the Property statement and on the value property of the Set statement. For an Event, the attribute cannot be specified directly in the Event declaration. Instead, a Delegate is typically declared and the marshaling is added to the Delegate statement in the same way as for a Sub or Function. Then the As delegate clause is used on the Event statement. An example of such code 500 is shown in FIG. 5.

Figure 6:
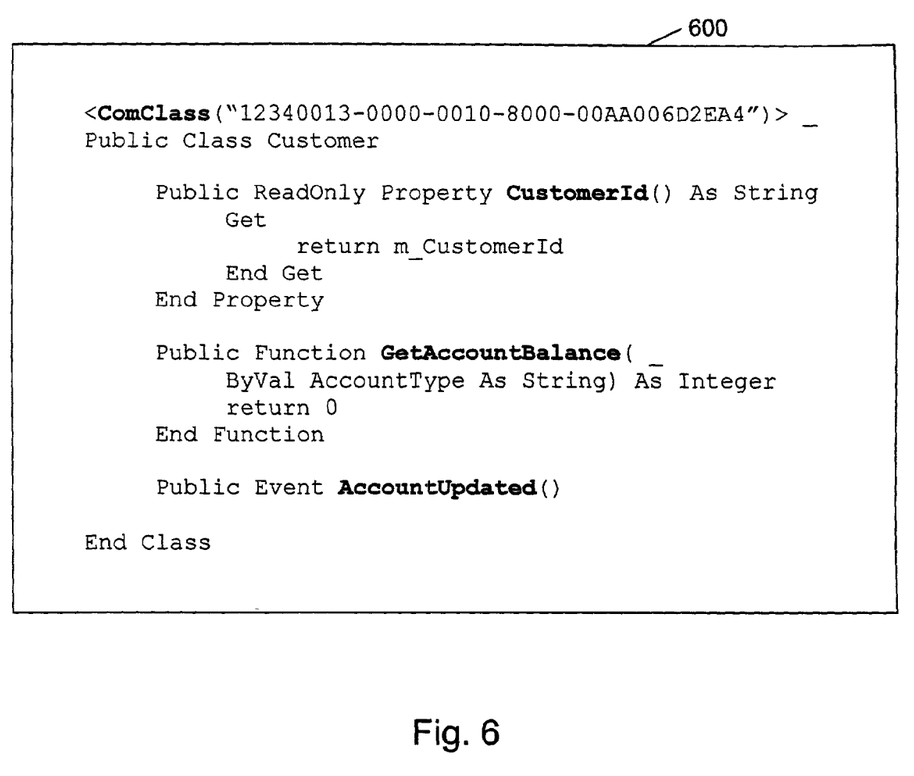
FIG. 6 is an exemplary programming code listing for a file having Visual Basic code useful for demonstrating an attribute in accordance with the present invention.
Figure 7:
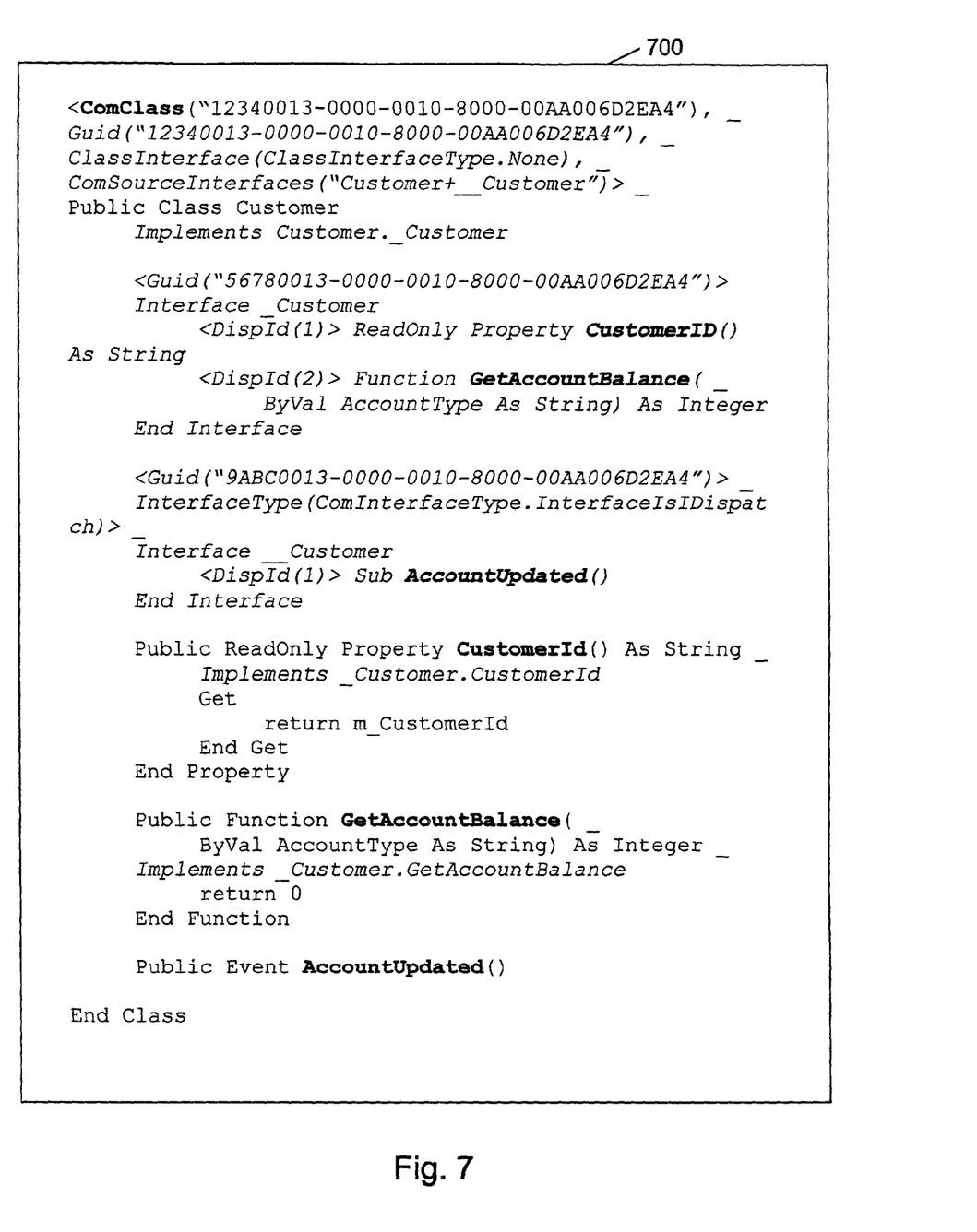
FIG. 7 is an exemplary compiled code listing for the file of FIG. 6 that has been generated in accordance with the present invention.

FIG. 6 shows an exemplary programming code listing 600 for a class, and FIG. 7 shows the code 700 after the present invention has acted on it, via a compiler in the presence of the ComClassAttribute. Italicized print is what is auto-generated by the compiler. It is contemplated that an upgrade tool could add this attribute for classes that were exposed to COM in Visual Basic 6.

It is contemplated that compatibility requirements can be provided in additional fields in ComClassAttribute. In this manner, comparability with a previous version or with an externally defined class or interface can be achieved.

In accordance with an aspect of the invention, if the user omits a GUID, the compiler will generate a new unique GUID on each compilation. Preferably, if the user does not change the class in any way, the GUIDs will be the same from build to build.

Due to the interoperability features of the present invention, migration and adoption of a new language and platform is supported. The act of exposing a class to COM is easy and robust. The present invention provides consistent v-table ordering due to base-class versioning and automatically exposes an event interface.

As mentioned above, while exemplary embodiments of the present invention have been described in connection with various computing devices and network architectures, the underlying concepts may be applied to any computing device or system in which it is desirable to provide interoperability of objects between various platforms. Thus, the techniques for interoperability in accordance with the present invention may be applied to a variety of applications and devices. For instance, interoperability aspects of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the interoperability aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the interoperability capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. In a computer system, a method of generating an interoperability interface, comprising:
   receiving first programming language code for a first platform based on a first standard, the first standard being a binary standard;
   providing an attribute mechanism to a second platform based on a second standard different than the first standard;
   validating the attribute mechanism, comprising verifying the validity of specified globally unique identifiers for the second platform; and
   generating second programming language code for the second platform responsive to the first programming language code for the first platform and the attribute mechanism, the interoperability interface corresponding to the second programming language code,
   wherein the attribute mechanism comprises at least one attribute added to a class declaration to generate the interoperability interface by the second platform at compilation time.

2. The method of claim 1, wherein receiving the first programming language code comprises receiving a class of objects for the first platform, and generating the second programming language code comprises generating a mapped class of objects in the second platform.

3. The method of claim 1, wherein generating the second programming language code comprises compiling the first programming language code with the attribute mechanism.

4. The method of claim 3, wherein compiling the first programming language code with the attribute mechanism comprises generating a plurality of class and events interfaces and adding attributes to the interfaces.

5. The method of claim 1, further comprising checking a plurality of rules prior to generating the second programming language code.

6. The method of claim 5, further comprising generating at least one of an error message and a warning message responsive to the checking of the rules.

7. The method of claim 1, wherein validating the attribute mechanism further comprises determining if a conflict of attributes of the second platform exists; determining the uniqueness of the specified globally unique identifiers for the second platform; determining the legality of class modifiers for the second platform; and determining if name collisions of a class of the second platform exist.

8. A computer readable storage medium having stored thereon computer executable instructions for performing a method of generating an interoperability interface, the method comprising:
   receiving first programming language code for a first platform based on a first standard, the first standard being a binary standard;
   providing an attribute mechanism to a second platform based on a second standard different than the first standard, the second standard being a logical standard;
   validating the attribute mechanism, comprising verifying the validity of specified globally unique identifiers for the second platform; and
   generating second programming language code for the second platform responsive to the first programming language code for the first platform and the attribute mechanism, the interoperability interface corresponding to the second programming language code,
   wherein the attribute mechanism comprises at least one attribute added to a class declaration to generate the interoperability interface by the second platform at compilation time.

9. The computer readable medium of claim 8, having further computer executable instructions for receiving a class of objects for the first platform when receiving the first programming language code, and generating a mapped class of objects in the second platform when generating the second programming language code.

10. The computer readable storage medium of claim 8, having further computer executable instructions for compiling the first programming language code with the attribute mechanism when generating the second programming language code.

11. The computer readable storage medium of claim 10, having further computer executable instructions for generating a plurality of class and events interfaces and adding attributes to the interfaces when compiling the first programming language code with the attribute mechanism.

12. The computer readable storage medium of claim 8, having further computer executable instructions for checking a plurality of rules prior to generating the second programming language code.

13. The computer readable storage medium of claim 12, having further computer executable instructions for generating at least one of an error message and a warning message responsive to the checking of the rules.

14. The computer-readable storage medium of claim 8, wherein validating the attribute mechanism further comprises determining if a conflict of attributes of the second platform exists; determining the uniqueness of the specified globally unique identifiers for the second platform; determining the legality of class modifiers for the second platform; and determining if name collisions of a class of the second platform exist.

15. A system for generating an interoperability interface between a first platform based on a first standard and a second platform based on a second standard, comprising:
   a module that receives first programming language code for a first platform based on a first standard, the first standard being a binary standard;
   a module that provides an attribute mechanism to a second platform based on a second standard different than the first standard, the second standard being a logical standard; and
   a processor that validates the attribute mechanism, comprising verifying the validity of specified globally unique identifiers for the second platform, and generates second programming language code for the second platform responsive to the first programming language code for the first platform and the attribute mechanism, the interoperability interface corresponding to the second programming language code, wherein the attribute mechanism comprises at least one attribute added to a class declaration to generate the interoperability interface by the second platform at compilation time.

16. The system of claim 15, wherein the first programming language code comprises a class of objects for the first platform, and the second programming language code comprises a mapped class of objects in the second platform.

17. The system of claim 15, wherein the processor comprises a compiler and the second programming language code comprises the first programming language code compiled with the attribute mechanism.

18. The system of claim 17, wherein the compiler generates a plurality of class and events interfaces and adds attributes to the interfaces.

19. The system of claim 15, wherein the processor checks a plurality of rules prior to generating the second programming language code.

20. The system of claim 19, wherein the processor generates at least one of an error message and a warning message responsive to the checking of the rules.

21. The system of claim 15, wherein the processor that validates the attribute mechanism further operates to determine if a conflict of attributes of the second platform exists; determine the uniqueness of the specified globally unique identifiers for the second platform; determine the legality of class modifiers for the second platform; and determine if name collisions of a class of the second platform exist.

* * * * *

UNITED STATES PATENT AND TRADEMARK OFFICE
CERTIFICATE OF CORRECTION

PATENT NO. : 7,210,132 B2 Page 1 of 1
APPLICATION NO. : 10/158325
DATED : April 24, 2007
INVENTOR(S) : John J. Rivard et al.

It is certified that error appears in the above-identified patent and that said Letters Patent is hereby corrected as shown below:

In column 10, line 34, delete "MICROSOFT™s" and insert -- MICROSOFT®'s --, therefor.

In column 11, line(s) 53–54, delete "InterfaceIslDispatch" and insert -- InterfaceIslDispatch --, therefor.

In column 15, line 55, delete "comparability" and insert -- compatibility --, therefor.

In column 17, line 30, in Claim 1, delete "standard;" and insert -- standard, the second standard being a logical standard; --, therefor.

In column 18, line 23, in Claim 9, after "readable" insert -- storage --.

Signed and Sealed this

Twentieth Day of July, 2010

David J. Kappos
*Director of the United States Patent and Trademark Office*